UNITED STATES PATENT OFFICE.

JAMES C. NOLAN, OF VIENNA, OHIO.

PAINT.

1,358,870.  Specification of Letters Patent.  Patented Nov. 16, 1920.

No Drawing.  Application filed September 23, 1919.  Serial No. 325,666.

*To all whom it may concern:*

Be it known that I, JAMES C. NOLAN, a citizen of the United States of America, residing at Vienna, in the county of Trumbull and State of Ohio, have invented certain new and useful Improvements in Paint, of which the following is a specification.

My present invention consists in a new and useful composition of matter to be used as a paint; containing the following ingredients, combined in proportions practically as stated, and in multiples thereof, viz;

| | |
|---|---|
| Coal tar (commercial) | 20 gallons. |
| Cement (as "Portland") | 10 pounds. |
| Paraffin | 5 pounds. |
| Red lead (commercial) | 5 pounds. |
| Sulfur | 2 pounds. |
| Salt (chlorid of sodium) | 2 pounds. |
| Pitch (coal tar product) | 20 pounds. |

Those ingredients are to be thoroughly and evenly mixed for use as a paint in the ordinary ways.

In detailing the ingredients of my new composition of matter I am aware that very similar paints could be made by slight deviations in the proportions of some or each of the amounts of the ingredients used, without departing from my invention; wherefore I do not limit my claims as to protection of and for my invention to the exact quantities specified, of necessity, for the purposes of this application for Letters Patent, but, broadly I claim;—

1. A paint consisting of coal-tar, cement, paraffin, red-lead, sulfur, salt and pitch, approximately mixed in quantities as described.

2. The composition of cement, paraffin, red-lead, sulfur, salt and pitch, in proportions respectively of 10, 5, 5, 2, 2 and 20 pounds, with approximately 20 gallons of coal tar.

In testimony whereof I affix my signature in the presence of two witnesses.

JAMES C. NOLAN.

Witnesses:
 H. T. UPTON,
 PEGGY BETHUNE.